(12) United States Patent
Kovanen et al.

(10) Patent No.: US 11,796,316 B2
(45) Date of Patent: Oct. 24, 2023

(54) METHOD FOR DETERMINING LOCATION AND ORIENTATION OF MACHINE

(71) Applicant: Novatron Oy, Pirkkala (FI)

(72) Inventors: Tuomas Kovanen, Pirkkala (FI); Antti Kolu, Pirkkala (FI); Petri Moisio, Pirkkala (FI); Mikko Vesanen, Pirkkala (FI); Arto Anttila, Tampere (FI)

(73) Assignee: Novatron Oy, Pirkkala (FI)

( * ) Notice: Subject to any disclaimer, the term of this patent is extended or adjusted under 35 U.S.C. 154(b) by 235 days.

(21) Appl. No.: 17/035,876

(22) Filed: Sep. 29, 2020

(65) Prior Publication Data

US 2021/0156119 A1    May 27, 2021

(30) Foreign Application Priority Data

Nov. 27, 2019  (FI) ...................................... 20196023

(51) Int. Cl.
| | | |
|---|---|---|
| *G01C 15/00* | (2006.01) | |
| *E02F 9/26* | (2006.01) | |
| *G06V 10/22* | (2022.01) | |
| *G06V 20/52* | (2022.01) | |
| *G01S 5/16* | (2006.01) | |
| *G06V 10/62* | (2022.01) | |

(52) U.S. Cl.
CPC .............. *G01C 15/002* (2013.01); *E02F 9/26* (2013.01); *G06V 10/225* (2022.01); *G06V 20/52* (2022.01); *G01S 5/16* (2013.01); *G06V 10/62* (2022.01)

(58) Field of Classification Search
CPC ... E02F 9/26; G01S 5/16; G01S 17/66; G06V 10/225; G06V 2201/06
See application file for complete search history.

(56) References Cited

U.S. PATENT DOCUMENTS

| | | |
|---|---|---|
| 9,757,859 B1 | 9/2017 | Kolb et al. |
| 2007/0064246 A1 | 3/2007 | Braunecker et al. |
| 2010/0046800 A1 | 2/2010 | Clark et al. |

(Continued)

FOREIGN PATENT DOCUMENTS

| | | |
|---|---|---|
| CN | 1856693 A | 11/2006 |
| EP | 2 993 620 A1 | 3/2016 |

(Continued)

OTHER PUBLICATIONS

Finnish Search Report received for Finnish Application No. 20196023 dated Mar. 27, 2020, 1 page.

(Continued)

*Primary Examiner* — Tyler J Lee
*Assistant Examiner* — Yufeng Zhang
(74) *Attorney, Agent, or Firm* — FISHERBROYLES, LLP

(57) ABSTRACT

A method determines location and orientation of a machine in a worksite. The worksite is equipped with at least one reference point. The method comprises setting a tracking apparatus on the machine, tracking the machine with the tracking apparatus by determining location of at least one reference point in the worksite with respect to the tracking apparatus, transmitting data from the tracking apparatus to a position determination unit regarding the tracking, and determining by the position determination unit based at least in part on the data received from the tracking apparatus the location and orientation of the machine in the worksite.

10 Claims, 6 Drawing Sheets

(56) References Cited

U.S. PATENT DOCUMENTS

| | | | |
|---|---|---|---|
| 2011/0010023 A1* | 1/2011 | Kunzig | G01C 21/206 |
| | | | 701/2 |
| 2011/0098923 A1 | 4/2011 | Lee | |
| 2014/0146167 A1 | 5/2014 | Friend et al. | |
| 2015/0098079 A1 | 4/2015 | Montgomery et al. | |
| 2015/0168136 A1 | 6/2015 | Kamat et al. | |
| 2015/0225923 A1 | 8/2015 | Wallace et al. | |
| 2016/0223673 A1 | 8/2016 | Smith et al. | |
| 2018/0283862 A1 | 10/2018 | Kahle et al. | |
| 2020/0088527 A1* | 3/2020 | Koda | G01C 21/30 |

FOREIGN PATENT DOCUMENTS

| | | | |
|---|---|---|---|
| GB | 2 301 185 A | | 11/1996 |
| JP | S59-195936 A | | 11/1984 |
| JP | 2018-184815 A | | 11/2018 |
| JP | 6529058 B1 | | 6/2019 |
| JP | 2019-143995 A | | 8/2019 |
| JP | 2019143995 A | | 8/2019 |
| JP | 2019-190064 A | | 10/2019 |
| WO | 2018/008627 A1 | | 1/2018 |

OTHER PUBLICATIONS

Lundeen et al., Optical marker-based end effector pose estimation for articulated excavators, Journal of Automation in Construction, https://doi.org/10.1016/j.autcon.2016.02.003, vol. 65, Feb. 26, 2016, pp. 51-64.

Finnish Office Action received for Finnish Application No. 20196023 dated Jun. 10, 2020, 5 pages.

First Office Action received for Chinese Patent Application Serial No. 202011329477.6 dated Feb. 17, 2022, 21 pages. (Including English Translation).

International Preliminary Report on Patentability received for PCT Application Serial No. PCT/EP2020/083352 dated Mar. 16, 2022, 42 pages.

Office Action for Japanese Patent Application Serial No. 2020-170345 dated Mar. 29, 2022, 9 pages. (Including English Translation).

Notice of Reasons for Refusal received for Japanese Patent Application Serial No. 2020-170328 dated Nov. 26, 2021, 6 pages. (Including English Translation).

Extended European search report received for European application No. 20202819.7 dated Mar. 10, 2021, 13 pages.

Office Action for corresponding Chinese Patent Application Serial No. 202011326873.3 dated Jan. 18, 2023, 27 pages (including English Translation).

Office Action received for Japanese Patent Application No. 2022-525311 dated Jun. 2, 2023, 4 pages (including English Translation).

* cited by examiner

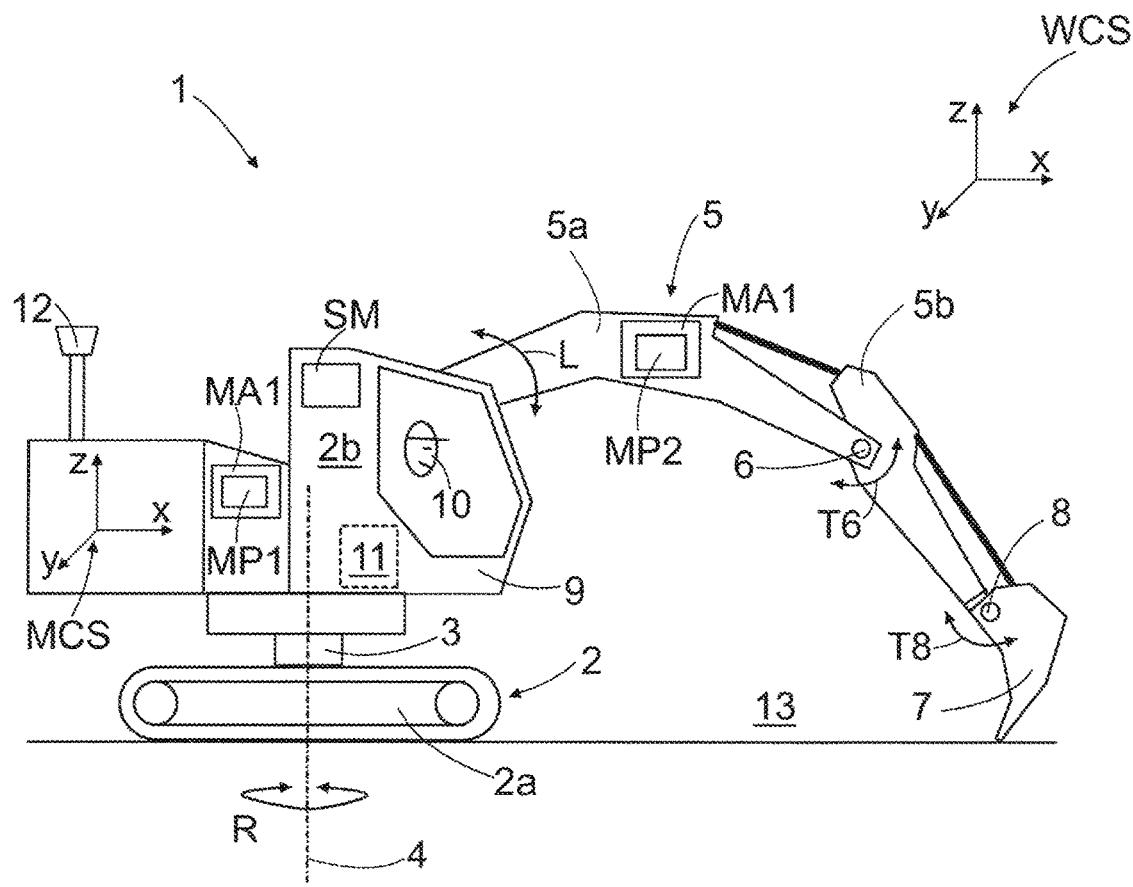
FIG. 1
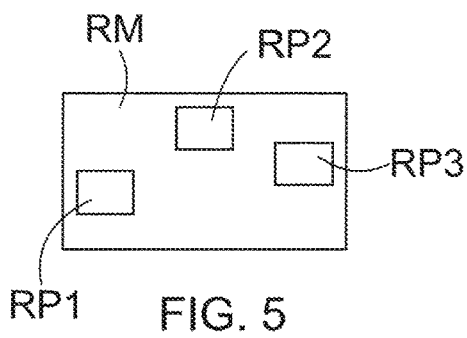
FIG. 5
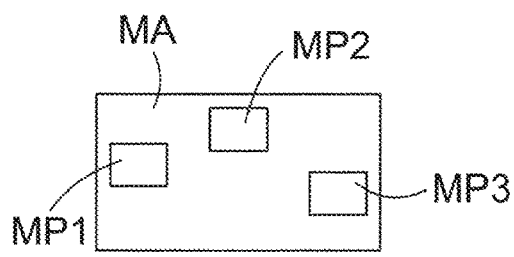
FIG. 6
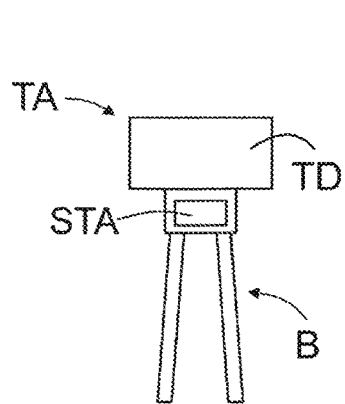
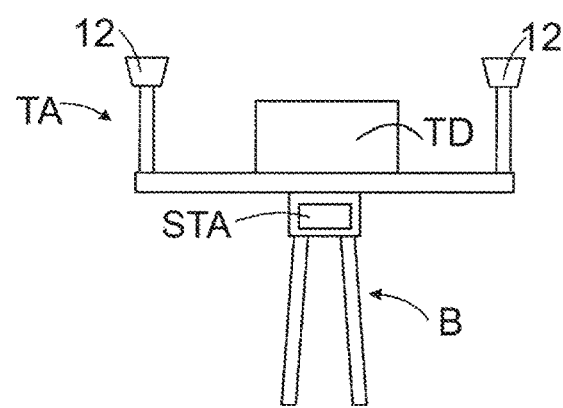
FIG. 7

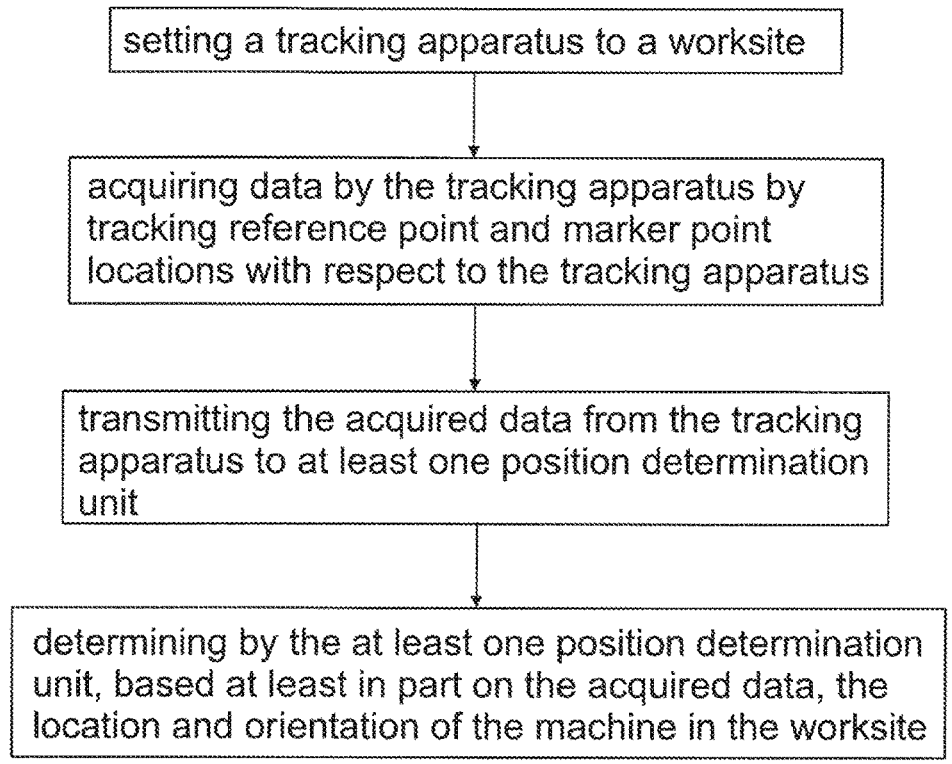

METHOD FOR DETERMINING LOCATION AND ORIENTATION OF MACHINE

CROSS-REFERENCE TO RELATED APPLICATION

This application claims benefit and priority to Finnish Application No. 20196023, filed Nov. 27, 2019, which is incorporated by reference herein in its entirety.

BACKGROUND

Field

The invention relates to a method for determining location and orientation of a machine in a worksite.

summary Different types of work machines may be utilized at different earth-moving work sites or construction sites for example for moving soil or rock material from one location to another or to lift or lower materials to be used in the constructions. Examples of this kind of work sites include for example substructure construction work sites or housing construction work sites for buildings and road construction work sites. The work machines like that are for example excavators and mobile cranes.

The work machines and the working tools of the work machines should be able to be positioned very accurately in the work site in order to execute designed operations properly. The information regarding the accurate location of the work machine and the tool thereof may be shown to an operator of the work machine so that the operator may use the information when controlling the tool and the machine. This accurate location information of the machine and the tool thereof is especially important when it is utilized in semiautomatic or fully automatic work machines, i.e. work machines operating at least some time without a constant control by the operator of the machine, and whereby possible misplacement of the machine or its tool is not immediately rectified by the operator of the machine.

Generally automatic positioning of the machine may be based for example on a satellite-based positioning system GNSS (Global Navigation Satellite Systems), such as GPS (US), GLONASS (RU), Galileo (EU) or Compass (CN). Alternatively, the positioning of the work machine may be provided by means of a total station positioned to the work site.

However, in every work site there is not necessarily any or accurate enough satellite-based positioning system available, or the positioning system available is not sophisticated enough for high-precision determination of the location and orientation of the machine. Retrofitting of an older machine with a high-precision system is not necessarily very cost-effective. Also, a setup of the total station-based positioning system in the work site may be laborious especially if the total station-based system should be removed from the work site daily or many times each day.

Therefore, there is a need for a simple positioning solution which is easy to remove and set up again.

An object of the present invention is to provide a novel method for determining location and orientation of a machine in a worksite.

The invention is characterized by the features of the independent claim.

The invention is based on the idea of using at least one reference point arranged in the worksite and at least one tracking apparatus arranged in the machine, the tracking apparatus being arranged to track the machine with the tracking apparatus by determining location of the at least one reference point RP in the worksite with respect to the tracking apparatus, and thereafter determining the location and orientation of the machine in the worksite based at least in part on the data received from the tracking.

The invention provides a simple solution for determining location and orientation of the machine in the worksite.

Some embodiments of the invention are disclosed in the dependent claims.

According to an embodiment of the method, the method further comprises initializing a tracking state for the tracking apparatus by determining location and orientation of the tracking apparatus in a machine coordinate system.

According to an embodiment of the method, the method further comprises indicating by the position determination unit a current level of accuracy regarding the location and orientation of the machine achieved by the data received from the tracking apparatus.

According to an embodiment of the method, the method further comprises determining a level of accuracy regarding the location and orientation of the machine to be achieved, detecting by the position determination unit a need for higher level of accuracy regarding the location and orientation of the machine, and acquiring by the position determination unit an additional tracking data from the tracking apparatus.

According to an embodiment of the method, an additional tracking data from the tracking apparatus is acquired by at least one of: semi-automatically or automatically.

According to an embodiment of the method, the additional tracking data from the tracking apparatus acquired semi-automatically comprises arranging the position determination unit to provide at least one of: indicating an operator the need for the tracking apparatus to detect at least one reference point, indicating the operator the need for the tracking apparatus to detect another reference point, and indicating the operator the need for the tracking apparatus to detect at least one further reference point; and the operator operates the machine according to the indication.

According to an embodiment of the method, the setting of the tracking apparatus on the machine comprises setting the tracking apparatus on the machine on an adjustable base, and that the operator operates the adjustable base according to the indication and after each operating of the adjustable base initializing of the tracking state for the tracking apparatus by determining location and orientation of the tracking apparatus in the machine coordinate system occurs.

According to an embodiment of the method, the setting of the tracking apparatus on the machine comprises setting the tracking apparatus on the machine on an adjustable base, and that the additional tracking data from the tracking apparatus is acquired automatically by controlling the adjustable base by at least one of the tracking apparatus and the position determination unit.

According to an embodiment of the method, after the controlling of the adjustable base by at least one of the tracking apparatus and the position determination unit, initializing of the tracking state for the tracking apparatus by determining location and orientation of the tracking apparatus in the machine coordinate system occurs.

According to an embodiment of the method, the method further comprises setting one or more additional tracking apparatuses to the worksite and equipping the machine with at least one marker point known in the machine coordinate system, acquiring data by the one or more additional tracking apparatuses by tracking reference point and marker point locations with respect to the respective one or more additional tracking apparatuses, transmitting the acquired data from the one or more additional tracking apparatuses to the at least one position determination unit, and determining by the at least one position determination unit based at least in part on the data received from at least one of the tracking apparatus and the one or more additional tracking apparatuses, the location and orientation of the machine in the worksite coordinate system.

According to an embodiment of the method, the location and orientation of the tracking apparatus set in the machine may be defined in the machine coordinate system using one of the additional tracking apparatuses.

BRIEF DESCRIPTION OF THE DRAWINGS

In the following the invention will be described in greater detail by means of preferred embodiments with reference to the accompanying drawings, in which
FIG. 1 shows schematically a side view of an excavator;
FIG. 4 shows schematically an embodiment of a method for determining location and orientation of a machine in a worksite;
FIG. 5 shows schematically a reference marker with number of reference points to be arranged in the worksite for the determination of location and orientation of a machine in a worksite;
FIG. 6 shows schematically a marker with number of marker points to be arranged on the machine for the determination of location and orientation of a machine in a worksite;
FIG. 7 shows schematically an embodiment of a tracking apparatus;
FIG. 8 shows schematically sensors possibly arranged in a machine and/or a tracking apparatus.

For the sake of clarity, the figures show some embodiments of the invention in a simplified manner. Like reference numerals identify like elements in the Figures.

DETAILED DESCRIPTION

Figure 2:
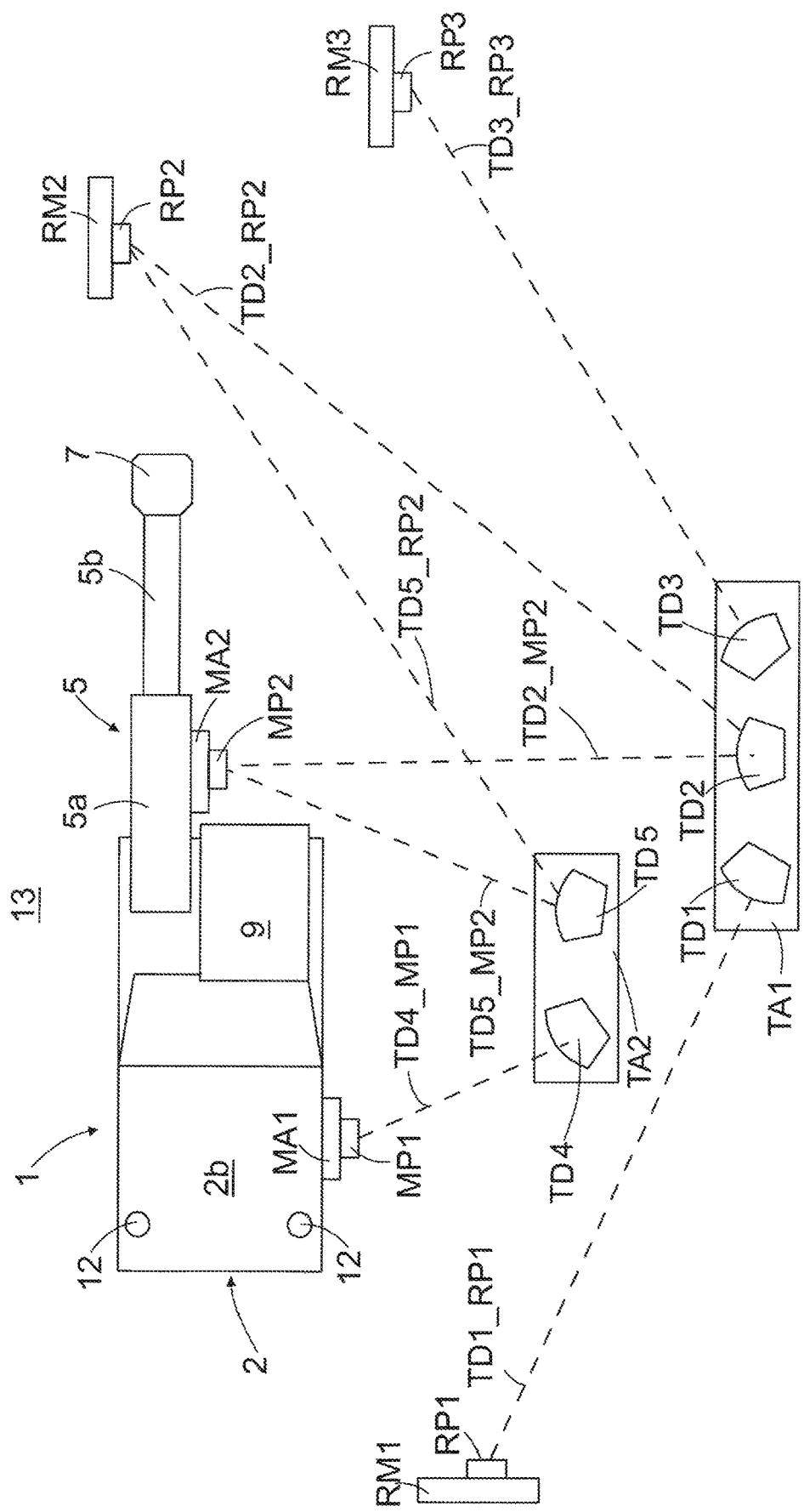
FIG. 2 shows schematically an upper view of a worksite.

FIG. 1 is a schematic side view of an excavator 1 at a worksite 13 wherein the excavator 1 is intended to be operated. The excavator 1 is one example of a work machine in connection with which the method and positioning system disclosed may be utilized.

The excavator 1 comprises a movable carriage 2 comprising an under carriage 2a, i.e. a lower carriage 2a, and an upper carriage 2b. The lower carriage 2a comprises caterpillar bands but could alternatively be provided with wheels. The upper carriage 2b is connected to the lower carriage 2a by means of a rotation axle 3 of the upper carriage 2b. The upper carriage 2b may be rotated relative to the lower carriage 2a around a rotation axis 4 as shown schematically with an arrow R. The rotation axis 4 coincides to a centre axis of the rotation axle 3.

The excavator 1 further comprises a boom 5 connected at the upper carriage 2b, whereby the boom 5 is arranged to turn together with the upper carriage 2b. The boom 5 may comprise at least a first boom part 5a. The boom 5 may also comprise further boom parts, such as a second boom part Sb. The boom 5 may be lifted and lowered relative to the upper carriage 2b as shown schematically with an arrow L.

The second boom part Sb may be connected to the first boom part Sa by means of a joint 6, allowing the second boom part Sb to turn about the first boom part Sa as shown schematically with an arrow T6. At a distal end of the second boom part Sb there is a working tool, in this case a bucket 7, and between the bucket 7 and the second boom part Sb there may be a joint 8, allowing the bucket 7 to be turn about the second boom part Sb as shown schematically with an arrow T8. In connection with the joint 8 there may also be joints or mechanisms allowing the bucked to be tilted in a sideward direction, for example.

On the carriage 2 there may be a control cabin 9 for an operator 10 of the excavator 1. The control cabin 9 may, for example, be provided with a moving arrangement allowing a vertical position of the control cabin 9 to be adjusted relative to the carriage 2.

The excavator 1 further comprises at least one control unit 11 which is configured to control, in response to received control actions, operations of the excavator 1, such as operations of the carriage 2, the boom 5 and the bucket 7.

The excavator 1 may further comprise a number of satellite receiving devices, such as antennas 12, if the excavator 1 is intended to be able to utilize a kind of a satellite-based positioning system GNSS (Global Navigation Satellite Systems). Antennas 12 may for example be placed on the upper carriage 2b.

Figure 3:
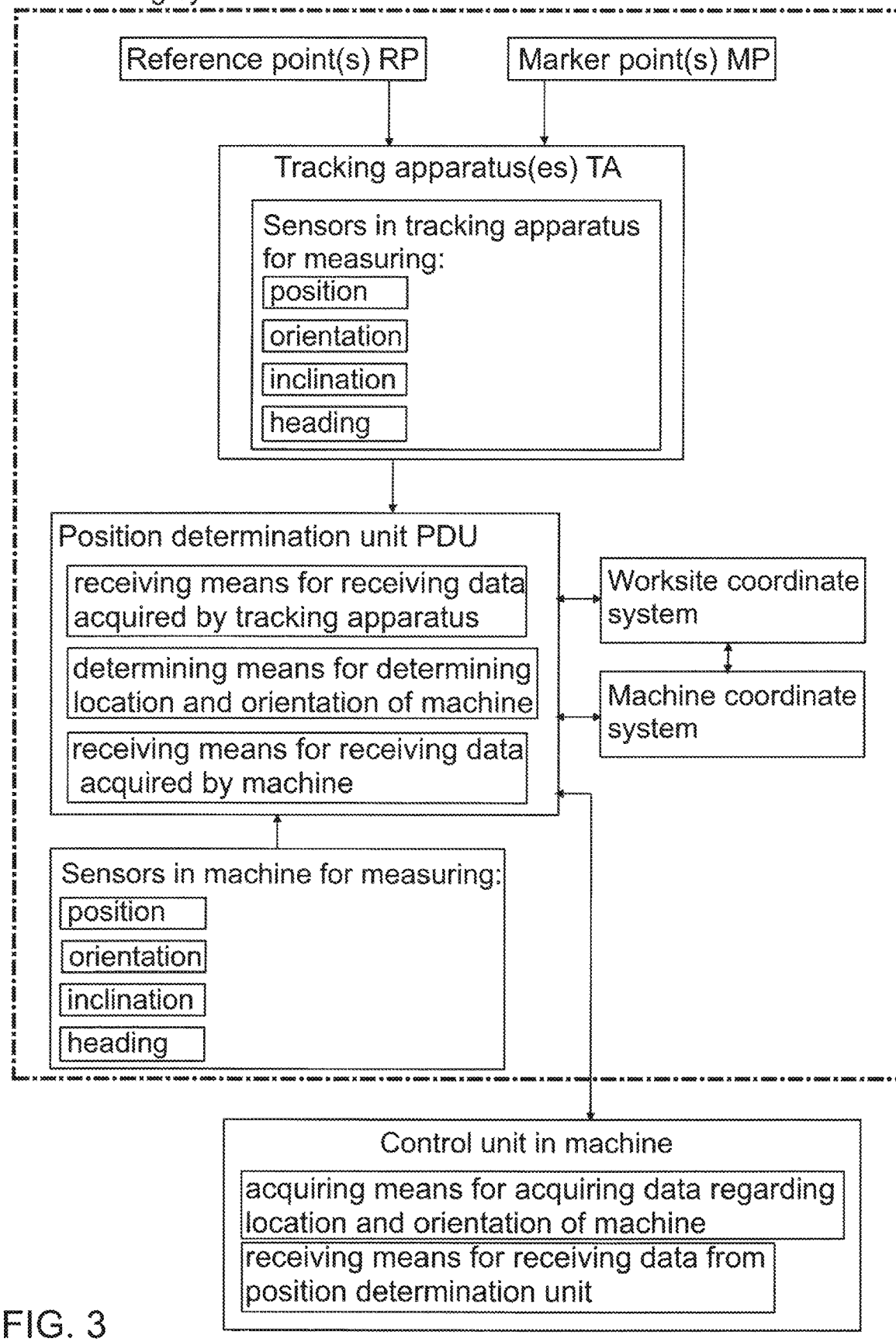
FIG. 3 shows schematically some components of a positioning system for determining location and orientation of a machine in a worksite.

FIG. 2 shows schematically an upper view of the worksite 13 wherein the excavator 1 is about to operate. In the example of FIG. 2 there is at the worksite 13 the excavator 1 as well as some equipment of the positioning system PS for determining the location and orientation of the excavator 1, or alternatively some other machine, in the worksite coordinate system WCS. Also a control system of the excavator 1 may comprise a machine coordinate system MCS of its own, whereby the machine coordinate system MCS may be fixed to machine with marker points MP arranged in the machine such that the positioning provided by the positioning system PS allows the machine coordinate system MCS to be identified with respect to the worksite coordinate system WCS. The worksite coordinate system WCS and the machine coordinate system MCS are shown schematically in FIG. 1. FIG. 3, in turn, shows schematically an embodiment of the positioning system PS with some additional equipment related to the positioning system PS.

The positioning system PS comprises at least one reference marker RM, i.e. one or more reference markers RM set in the worksite 13. The reference marker RM arranged in the worksite 13 may for example be aruco marker, QR-code, light emitting marker, light reflecting marker, prism or the like. Each reference marker RM provides at least one reference point RP, i.e. one or more reference points RP, whereby there is at least one reference point RP in the worksite 13 determined in the worksite coordinate system WCS for the determination of the location and orientation of the machine. For the sake of clarity, determining and/or defining and/or calculating an orientation of a machine and/or an apparatus in worksite and/or in a coordinate system in this description means the determining the needed three angles, such as roll, pitch and yaw, to accurately determine in which position the machine and/or the apparatus is in the worksite and/or the coordinate system. Thus, when a location of at least one point and/or spot of a machine and/or an apparatus, which point and/or spot known in its own coordinate system, is or may be determined and an orientation of the machine and/or the apparatus is or may be determined, the machine and/or the apparatus may be fixed and/or placed and/or set and/or positioned accurately into the worksite or the coordinate system.

In the example of FIG. 2 there are schematically shown three reference markers RM, i.e. a first reference marker RM1, a second reference marker RM2 and a third reference marker RM3 set or arranged in the worksite 13. Each reference marker RM1, RM2, RM3 comprises one reference point RP, i.e. the first reference marker RM1 comprises a first reference point RP1, the second reference marker RM2 comprises a second reference point RP2 and the third reference marker RM3 comprises a third reference point RP3. The specific reference point RP may be provided by a specific point in the aruco marker or by a specific light emitting device in the light emitting marker, for instance. In the example of FIG. 5 it is shown schematically a reference marker RM with three reference points RP, i.e. a first reference point RP1, a second reference point RP2 and a third reference point RP3. Each of the reference points RP are identifiable and the locations of the reference points RP are determined in the worksite coordinate system WCS. Thus, having an identification data of a reference point RP, the location of the reference point RP in the worksite coordinate system WCS may be determined.

The positioning system PS further comprises at least one marker MA, i.e. one or more markers MA set on the machine, i.e. in the excavator 1. The marker MA arranged on the machine may for example be aruco marker, QR-code, light emitting marker such as optitrack, light reflecting marker or the like. Each marker MA provides at least one marker point MP, i.e. one or more marker points MP, whereby there is at least one marker point MP on the machine for the determination of the location and orientation of the machine. Each of the marker points MP of each machine are identifiable and the locations of the marker points MP are determined in the machine coordinate system MCS so that the positioning system PS positioning and identifying the marker points MP may be positioning the machine coordinate system MCS, i.e. the machine. Thus, having an identification data of a marker point MP, the location of the marker point MP in the machine coordinate system MCS may be determined.

In the example of FIG. 1 there are schematically shown two markers MA, i.e. a first marker MA1 and a second marker MA2, arranged on the machine. Each marker MA1, MA2 comprises one marker point MP, i.e. the first marker MA1 comprises a first marker point MP1 and the second marker MA2 comprises a second marker point MP2. The specific marker point MP may be provided by a specific point in the aruco marker or by a specific light emitting device in the light emitting marker, for instance. In the example of FIG. 6 it is shown schematically a marker MA with three marker points MP, i.e. a first marker point MP1, a second marker point MP2 and a third marker point MP3.

The positioning system PS further comprises at least one tracking apparatus TA, i.e. one or more tracking apparatuses TA arranged in the worksite 13. The tracking apparatus TA tracks or monitors reference points RP and marker points MP and especially the identification data and locations thereof relative to the tracking apparatus TA in the worksite 13. Based on the initialization of the tracking the tracking apparatus TA tracks the locations of the at least one identified reference point RP in the worksite 13 and the at least one identified marker point MP in the machine. Thus, by using the identification data of the at least one reference point RP the positioning system PS is able to locate the reference point RP in the worksite coordinate system WCS, by using the identification data of the at least one marker point MP the positioning system PS is able to locate the marker point MP in the machine coordinate system MCS and after the positioning system PS has tracked the location of the at least one identified reference point RP and at least one identified marker point MP with respect to it, the positioning system PS is able to determine the location and orientation of the machine coordinate system MCS, i.e. the machine, in the worksite coordinate system WCS. The tracking apparatus TA comprises at least one tracking device TD, i.e. one or more tracking devices TD to provide a visual communication between the tracking apparatus TA and reference points RP and marker points MP. Furthermore, the tracking apparatus TA comprises means, such as an input-output unit, for receiving and/or sending information.

The tracking or monitoring takes place or is carried out through a visual communication between the tracking apparatus TA and respective reference points RP and marker points MP. In the example of FIG. 2 there are two tracking apparatuses TA arranged in the worksite 13, i.e. a first tracking apparatus TA1 and a second tracking apparatus TA2. The first tracking apparatus TA1 comprises three tracking devices, i.e. a first tracking device TD1, a second tracking device TD2 and a third tracking device TD3 to provide at some time instant a first visual connection TD1_RP1 between the first tracking device TD1 and the first reference point RP1, a second visual connection TD2_RP2 between the second tracking device TD2 and the second reference point RP2 and a third visual connection TD3_RP3 between the third tracking device TD3 and the third reference point RP3. Additionally, the second tracking device TD2 is arranged to provide a fourth visual connection TD2_RM2 between the second tracking device TD2 and the second marker point MP2. The second tracking apparatus TA2 comprises two tracking devices, i.e. a fourth tracking device TD4 to provide a fifth visual connection TD4_MP1 between the fourth tracking device TD4 and the first marker point MP1 and a fifth tracking device TD5 to provide a sixth visual connection TD5_MP2 between the fifth tracking device TD5 and the second marker point MP2. Additionally, the fifth tracking device TD5 is arranged to provide a seventh visual connection TD5_RP2 between the fifth tracking device TD5 and the second reference point RP2.

In the embodiment of FIG. 2 there are shown two tracking apparatuses, i.e. the first tracking apparatus TA1 provided with three tracking devices TD1, TD2, TD3 to track at some time instant the reference point RP1, RP2, RP3 locations and the second marker point MP2 location, and the second tracking apparatus TA2 provided with two tracking devices TD4, TD5 to track at some time instant the marker point MP1, MP2 locations and the second reference point RP2 location. However, each of the tracking apparatuses TA1, TA2 could comprise only a single tracking device to track the respective reference point RP1, RP2, RP3 locations and marker point MP1, MP2 locations. Furthermore, the positioning system could comprise only a single tracking apparatus with one or more tracking devices TD to track the reference point RP1, RP2, RP3 and marker point MP1, MP2 locations. Further, if two or more tracking apparatuses TA, e.g. TA1, TA2, are at known orientation and location with respect to each other, it corresponds to an arrangement having one tracking apparatus TA and all the tracking devices TD (such as TD1, TD2, TD3, TD4, TD5) of the two or more tracking apparatuses TA (such as TA1, TA2), whereby, in cases TA1 manages to track only reference points RP and TA2 manages to track only marker points MP the combination of all the acquired data enables the determination of the location and orientation of the machine in the worksite 13.

The tracking device TD1, TD2, TD3, TD4, TD5 is a device capable to establish or provide a visual connection between the tracking apparatus TA and the at least one reference point RP and/or the at least one marker point MP. According to an embodiment the tracking device is a camera, a stereocamera, a lidar or a tachymeter.

The camera and/or the stereocamera may be equipped with a lens or an objective having such a focal point that the camera and/or the stereocamera is capable of establishing an accurate visual connection to objects remaining substantially close to the camera and/or the stereocamera or farther from the camera and/or the stereocamera, such as objects locating in the worksite 13 substantially farther away from the camera and/or the stereocamera than the machine. The camera and/or the stereocamera may therefore be capable of providing zooming effect to the objects locating substantially far away from the tracking apparatus TA.

According to an embodiment of the tracking apparatus TA, the tracking apparatus TA comprises a camera, or some other tracking device TD, and a base B for the camera or some other tracking device, whereby the tracking apparatus TA may be set at a specific fixed position at a ground in the worksite 13. FIG. 7 shows schematically, on the left, this kind of tracking apparatus TA.

In order to gain high accuracy using one camera, or some other tracking device TD, tracking apparatus TA, the tracked reference points RP and marker points MP should be farther apart from each other and/or they may not be too far away from the tracking apparatus TA. Using one camera, there should preferably be at least four reference points RP forming a plane and at least four marker points MP forming a plane as well. Using two, three or more tracking devices TD in tracking apparatus TA, the distances between the tracking apparatus TA and the reference points RP and marker points MP may be longer and the amount of tracked reference points RP and marker points MP may be smaller. In other words, the more tracking devices TD there is, the more tracked reference points RP there is, the more tracked marker points MP there is and the less distance between the tracking apparatus TA and the tracked reference points RP and the tracked marker points MP there are, the higher the accuracy is. Bearing in mind that the locations of the tracked reference points RP compared to each other influence on the accuracy, as well as the locations of the tracked marker points MP compared to each other influence on the accuracy. Preferably, each tracking apparatus TA having a number of tracking devices TD, i.e. one or more tracking devices, tracks constantly at least one reference point RP and at least one marker point MP.

According to another embodiment of the tracking apparatus TA, the tracking apparatus TA may comprise a base that is capable to move within boundaries of the worksite 13, whereby a position of the tracking apparatus TA in the worksite 13 may be easily changed. This kind of tracking apparatus TA may for example be a drone provided with two or more tracking devices TD. A control unit of the drone may be configured in such a way that the drone is not allowed to exceed the boundaries of the worksite 13. During the determination of location and orientation of a machine in the worksite 13 the drone is preferably stationary. Alternatively, the drone may be stationary only in times when a threshold level regarding requested accuracy of position and orientation of a machine may not otherwise be exceeded.

The base B of the tracking apparatus TA may be adjustable, whereby an alignment of the tracking apparatus TA may be adjusted by adjusting the alignment of the base B. Therefore, according to an embodiment of the positioning system PS, at least one of the tracking devices TD may be installed on an adjustable base. The adjustable base of the tracking device TD allows the orientation of the base B and thereby the orientation of the tracking device TD to be adjusted conveniently by, for example, taking into account the area where the machine will be working and/or the locations of the nearest reference points RP.

According to an embodiment of the positioning system, the tracking apparatus TA comprises means for acquiring data relating to the orientation of each of the tracking devices TD on adjustable bases B with respect to the tracking apparatus TA. When the orientation of the tracking device TD with respect to the tracking apparatus TA is known, the position and orientation of the machine may be determined accurately. The adjustment of the base B may be automated or remote controlled, but it may also be manually operated, whereby there may be in the base B a scale division to indicate the orientation of the base B, for example, mounting points selectable in the direction of rotation, for example, in every 5 to 15 degrees.

The positioning system PS further comprises at least one position determination unit PDU, i.e. one or more position determination units PDU. The position determination unit PDU comprises receiving means for receiving data acquired by the at least one tracking apparatus TA. The data acquired by the at least one tracking apparatus TA comprises identification data for identifying reference points RP and marker points MP as well as the locations thereof relative to the tracking apparatus TA, i.e. the locations of the reference points RP identified and the locations of the marker points MP identified relative to the location of the detecting tracking apparatus TA, the identification data associating each specific reference point RP in the worksite coordinate system WCS and each specific marker point MP in the machine coordinate system MCS with respective location data of each reference point RP and each marker point MP relative to the tracking apparatus TA.

The locations relative to the location of the tracking apparatus are, for example, three dimensional coordinates in the coordinate system of the tracking apparatus. Alternatively, the locations may be three-dimensional coordinates in the worksite coordinate system WCS and/or three-dimensional coordinates in the machine coordinate system MCS.

The position determination unit PDU further comprises determining means for determining, based at least in part on the received data, i.e. based at least in part on the data acquired by the tracking apparatus TA, the location and orientation of the machine in the worksite coordinate system WCS. If there is also available the machine coordinate system MCS fixed to the machine, the location and orientation of the machine in the worksite coordinate system WCS may be transformed to the location and orientation of the worksite in the machine coordinate system MCS to implement work tasks to be carried out by the machine.

The at least one position determination unit PDU may be implemented by a combination of hardware and software. The implementation comprises an input/output-unit to communicate with other devices connected with the position determination unit PDU and a microprocessor or some other processing means capable to carry out a computer program that is configured to process the data received by the position determination unit PDU. The implementation may also comprise at least one memory unit to store at least temporarily the data received by the position determination unit PDU and/or the data to be sent forward from the position determination unit PDU.

The at least one position determination unit PDU may for example reside in a computer reachable by any wired or wireless network, and/or the machine and/or the at least one tracking apparatus TA. When the position determination unit PDU resides in the computer reachable by any wired or wireless network, the physical location of the position determination unit PDU may be selected freely, the position determination unit PDU may thus be inside or outside of the worksite 13. When the position determination unit PDU resides in the machine, it may for example be implemented in the control unit 11 of the machine. When the position determination unit PDU resides in the at least one tracking apparatus TA, the tracking apparatus TA is configured to comprise necessary means to implement the operation of the position determination unit PDU.

In the case of the at least one position determination unit PDU residing in a computer reachable by any wired or wireless network or in the at least one tracking apparatus TA, or at least one position determination unit PDU not residing in the control unit of the machine, the machine comprises at least one control unit, such as the control unit 11, acquiring data regarding the location and orientation of the machine, wherein the control unit is configured to select at least one position determination unit PDU from which it receives the determined location and orientation of the machine in the worksite 13.

According to an embodiment, at least one position determination unit PDU comprises receiving means for receiving data acquired by the machine. The data acquired by the machine may for example regard to data acquired by at least one sensor SM (FIG. 1), i.e. one or more sensors SM possibly installed in the machine for determining position and/or orientation and/or inclination and/or heading of the machine. The one or more sensors SM possibly installed in the machine are discussed in more detail later.

When the location and orientation of the machine in the worksite 13 is determined, at least one marker point MP is arranged on the machine and at least one reference point RP is arranged in the worksite 13. The method further comprises arranging at least one tracking apparatus TA in the worksite 13, for acquiring data by tracking reference point RP locations and by tracking marker point MP locations with respect to the tracking apparatus TA. The data acquired by the tracking apparatus TA is transmitted from the tracking apparatus TA to the position determination unit PDU. The position determination unit PDU determines, based at least in part on the acquired data received from the tracking apparatus TA, the location and orientation of the machine in the worksite 13. FIG. 4 shows schematically an embodiment of the method for determining location and orientation of the machine in the worksite 13.

The installation of the tracking apparatus TA at the worksite 13 may be implemented only by arranging the tracking apparatus TA in the worksite 13, and thereafter the tracking apparatus TA may itself track or find the at least one reference point RP and the at least one marker point MP in the worksite 13 and acquiring data about the locations of the at least one reference point RP and the at least one marker point MP in the worksite 13. There is thus no need to accurately adjust or position the tracking apparatus TA in the worksite 13 unlike generally known tachymeter or similar device.

Basically, the tracking apparatus TA is configured to find all the reference points RP and the marker points MP that are in an operating range of the tracking apparatus TA. If there is not any reference point RP or any marker point MP set in the worksite 13, the tracking apparatus TA is not able to acquire data from the at least one reference point RP and/or from the at least one marker point MP and will therefore not provide the respective data about the location of the at least one reference point RP and/or the at least one marker point MP. In case where the tracking apparatus TA is arranged in the worksite 13 and it is unable to identify any reference points RP and/or marker points MP, the tracking apparatus may signal it by any known means. Also, the tracking apparatus may signal by any known means how many reference points and/or marker points MP it is able to identify from its current location. Thus, the person who is arranging the tracking apparatus TA in the worksite may get feedback regarding what kind of place the person is arranging the tracking apparatus TA to. The feedback may indicate the accuracy level reachable by the current location of the tracking apparatus TA.

The minimum requirement for the tracking apparatus TA to start assisting in determining the location and orientation of a machine is to identify at least one reference point RP and track its location with respect to the tracking apparatus and to identify at least one marker point MP and track its location with respect to the tracking apparatus and transmit the data regarding the tracked reference point RP identification and tracked marker point MP identification and their tracked locations with respect to the tracking apparatus to at least one position determination unit PDU. If the minimum requirements are not fulfilled, the tracking apparatus TA may indicate it.

Further, in addition to all the information transmitted by the tracking apparatus TA to the position determination unit PDU, the position determination unit PDU need to acquire the location information of the identified reference point RP in the worksite coordinate system WCS and to acquire the location information of the identified marker point MP location in the machine coordinate system MCS. The location information relating to the reference points RP in the worksite coordinate system WCS and the marker points MP in the machine coordinate system MCS may be received by the position determination unit PDU in any known method.

To start determining the location and orientation of a machine, the position determination unit PDU may need additional information. The additional information needed depends on how much information the position determination unit PDU receives from a tracking apparatus TA.

Thus, regarding the arranging the tracking apparatus TA, it need be arranged such that it is able to identify at least one reference point RP and at least one marker point MP. The person arranging the tracking apparatus TA may be aware of that the machine has not arrived in the worksite 13 yet, so if the tracking apparatus TA informs it cannot find any marker points MP, the person may ignore that information. Or, if some temporary barrier prevents the tracking apparatus TA to identify one or more reference points RP and it leads to a situation that the tracking apparatus TA is not able to identify any reference point RP, the person may ignore that information and be aware that the tracking may begin only after the temporary barrier has been moved away.

According to an embodiment of the positioning system PS, at least one tracking apparatus TA comprises at least one sensor STA (FIG. 7), i.e. one or more sensors STA for determining position and/or orientation and/or inclination and/or heading of the tracking apparatus TA. The data including the information about the position and/or orientation and/or inclination and/or heading of the tracking apparatus TA is also considered to be data acquired by the tracking apparatus TA, whereby the data acquired by the tracking apparatus TA and communicated to the position determination unit PDU may also comprise the data including the information about the position and/or orientation and/or inclination and/or heading of the tracking apparatus TA.

According to an embodiment of the positioning system PS, the machine comprises at least one sensor SM (FIG. 1), i.e. one or more sensors SM for determining position and/or orientation and/or inclination and/or heading of the machine. The sensors in the machine may also include sensors relating to the determination of the orientation of the working tool of the machine. The effect of this embodiment is that in the event of the visual communication lacking between the tracking apparatus TA and the at least one reference point RP in the worksite 13 and/or the at least one marker point MP in the machine, for example due to an obstacle occurring between the machine and the at least one reference point RP and/or the marker point MP, the machine may still be able to continue, at least to some time, the operation thereof because of information acquired by the at least one sensor SM in the machine. The machine may for example remain at its current state which has been already determined by the position determination unit PDU before the obstacle occurring between the tracking apparatus TA and the at least one reference point RP and/or the marker point MP and continue to determine or track the position of the working tool relative to the machine. The time period how long the machine may be able to continue its operation may depend on the accuracy required at current task and the data acquired by the tracking apparatus TA before the obstacle occurring between the machine and the at least one reference point RP and/or the at least one marker point MP. The time period may as well depend on how accurate the at least one sensor SM in the machine is as well as how many sensors SM there are. Another effect relating to that the sensors in the machine may also include sensors relating to the determination of the orientation of the working tool of the machine is that if one or more marker points MP reside a place that is not fixedly connected to the part of the machine where, for example, the origin of the machine coordinate system MCS locates, the position determination unit PDU needs the information on how was the place oriented with respect to the machine coordinate system MCS or which was the location of the marker point MP in question in machine coordinate system MCS in the exact time of tracking. This kind of places may be found, for example, from the boom 5 of the excavator 1, where, for example, MP2 of FIG. 1 resides.

The one or more sensors in the machine and/or in the tracking apparatus TA may be at least one of: a gyroscope, an accelerometer, an inclinometer, a magnetic compass, a satellite-based compass, an angle sensor, a position sensor, a pendulum, a spirit level measuring device and any other sensor, such as camera sensors, laser receiver/detector or lidar, suitable for the purpose of determining at least one of position, location and orientation of at least one of an object and one or more objects attached to each other. FIG. 8 shows schematically some of these sensors. When considering for example the excavator 1, the term object herein refers to the boom 5, the boom parts 5a, 5b thereof and the working tool, such as the bucket 7. In the excavator 1 the sensors are preferably selected in such a way that it is possible to determine the mutual orientation of the under carriage 2a and upper carriage 2b as well as the orientation of the boom 5 and/or the parts 5a, 5b thereof and the working tool, such as the bucket 7, relative to the under carriage 2a and upper carriage 2b. When considering for example the excavator 1, the term object herein refers to the mutual orientation of the tracking devices TD in the tracking apparatus TA and mutual orientation of the tracking device TD and a possible base B thereof.

According to an embodiment the tracking apparatus TA further acquires data relating to stability of the tracking apparatus TA. The stability of the tracking apparatus describes reliability of the data acquired by the tracking apparatus.

According to an embodiment for acquiring data relating to the stability of the tracking apparatus TA, the tracking apparatus TA comprises at least one gyroscope and/or at least one accelerometer for determining the stability of the tracking apparatus TA. The at least one gyroscope and/or the at least one accelerometer may be used to determine for example swinging or shaking of the tracking apparatus TA, an amount of swinging or shaking of the tracking apparatus TA depicting the stability of the tracking apparatus TA which, in turn, describes the accuracy of the data acquired by the tracking apparatus TA.

According to a further embodiment for acquiring data relating to the stability of the tracking apparatus TA, it may be consecutively observed from the data acquired by the tracking apparatus TA relating to the at least one reference point RP. According to an embodiment like this, the position determination unit PDU, for example, may be configured to determine a variation of the data acquired by the tracking apparatus TA, and in case of the variation being significant, i.e. higher than the accuracy needed to carry out the work, it may be assumed that at least one of the reference point RP and the tracking apparatus TA is swinging or shaking, whereby the accuracy of the data acquired by the tracking apparatus TA may be lower than expected. Being significant may depend on the current accuracy needed. The accuracy for the specific work task may for example be set in a building information model (BIM-model) set for the worksite 13. The position determination unit PDU may indicate the variation level, for example, in millimetres and/or in degrees and the operator may take it into account as lowered accuracy. Alternatively, the PDU may analyse the data acquired by the tracking apparatus TA and indicate the operator the cause of the variation.

Figure 9:
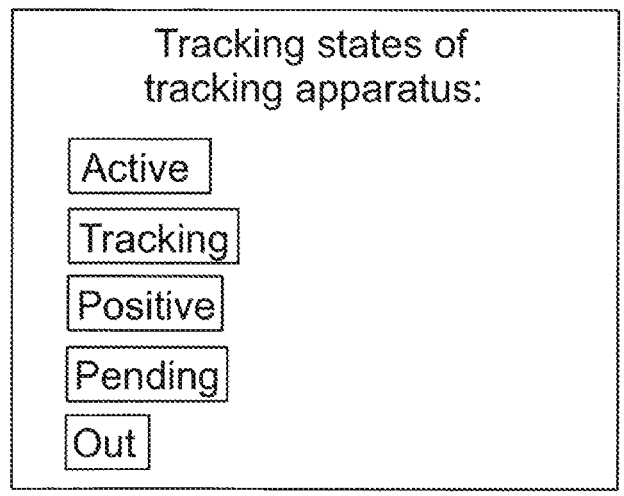
FIG. 9 shows schematically some possible tracking states of the tracking apparatus.

According to an embodiment a tracking state of the tracking apparatus TA is to be determined. The tracking state of the tracking apparatus TA describes a current prevailing operation state of the tracking apparatus TA. The tracking state of the tracking apparatus TA may be determined based on the data acquired by the tracking apparatus TA. The operation of the tracking apparatus TA may comprise at least the states Active, Tracking, Positive, Pending and Out, one stage of those prevailing at a time. FIG. 9 shows schematically some possible tracking states of the tracking apparatus TA.

When the tracking apparatus TA is on Active-state, the tracking apparatus TA acquires data by tracking the reference point RP and the marker point MP locations and transmits the acquired data forward to the position determination unit PDU. The tracking apparatus TA does not, however, provide any indication about the accuracy, reliability or validity of the acquired data.

When the tracking apparatus TA is on Tracking-state, the tracking apparatus TA acquires data by tracking the reference point RP and the marker point MP locations as well as acquires data from the sensors STA installed on the tracking apparatus TA and transmits the acquired data forward to the position determination unit PDU. Additionally, the tracking apparatus TA is actively conscious, for example, based on the determined accuracy and/or the amount of the acquired data as disclosed above, that it is capable of tracking a point and/or spot of any kind in the worksite coordinate system WCS accurately, i.e. correctly enough. Alternatively, based on what amount and which kind of sensors STA (disclosed above) are installed on the tracking apparatus TA, there may be determined the minimum amount of reference points RP and/or marker points MP to be tracked in each situation to be able to deem that the tracking apparatus TA is on Tracking-state. Thus, if it is tracked at least the minimum amount of reference points RP and/or marker points MP, the tracking apparatus is on Tracking-state and otherwise it is in some other state.

When the tracking apparatus TA is on Positive-state, the tracking apparatus TA acquires data by tracking reference point RP and marker point MP locations and transmits the acquired data forward to the position determination unit PDU. Additionally, the tracking apparatus TA is conscious of that it is operating correctly but for some reason, the correct operation of the tracking apparatus TA cannot be verified. One of the reasons may be that while being on Tracking-state, the minimum amount of tracked reference points RP is not fulfilled but, for example, the sensors installed on the tracking apparatus TA are able to verify that the stability of the tracking apparatus TA has not changed to a lower level after the situation the tracked reference points RP dropped below the minimum amount. The reason for this kind of situation may be, for example, people walking between one or more tracked reference points RP and the tracking apparatus TA. If this kind of situation lasts too long, the tracking state will be deemed to Active-state or, for example, someone approached to the tracking apparatus TA to shut it down.

When the tracking apparatus TA in on Out-state, the tracking apparatus TA is out of operation. It may, for example, have been shut down.

When the tracking apparatus TA in on Pending-state, the tracking apparatus TA is initializing its operation and changing its state from the Out-state towards the Tracking-state or the Active-state.

According to an embodiment the tracking apparatus TA is configured to determine the tracking state thereof and the tracking apparatus TA is further configured to transmit to the position determination unit PDU the tracking state and/or a change in the tracking state. The tracking apparatus TA may thus comprise necessary data processing means to identify its state and to transmit the state information forward.

According to an embodiment an availability of location-based features of the machine is dependent on the tracking state. According to this embodiment it is possible, depending on the tracking state of the tracking apparatus TA, that there is not available for the machine any position data at all or position data is not sufficient enough for work tasks requiring high accuracy, whereby the work task, that require utilizing position data the needed accuracy of which is above the current accuracy available, cannot be carried out but still it may be possible to carry out some other work tasks requiring accuracy that is equal or below current accuracy available. As well, some work tasks may require high certainty in minimum level of accuracy, thus, these work tasks may be unavailable if the tracking state is not Tracking. Alternatively, if the machine has many sensors SM assisting the position determination unit PDU, also Active and Positive tracking states may be enough, at least, for example, in cases where the state has a short period of time ago been Tracking.

According to an embodiment the tracking state of the tracking apparatus TA reaching the level of tracking accuracy capable of tracking a point and/or spot of any kind in the worksite coordinate system WCS accurately may be determined by at least one of: a) acquiring data by tracking at least three reference points RP with respect to the tracking apparatus TA; b) acquiring data by tracking one to two reference points RP with respect to the tracking apparatus TA in addition to acquiring data relating to an inclination of the tracking apparatus TA, and c) acquiring data by determining locations of at least four satellites with respect to the tracking apparatus TA.

According to an embodiment the tracking state of the tracking apparatus TA reaching the level of tracking accuracy capable of tracking a point and/or spot of any kind in the worksite coordinate system WCS accurately may thus be determined by acquiring data by tracking at least three reference points RP with respect to the tracking apparatus TA. These reference points may not lie on one line observed in three dimensions. The farther the reference points RP are from one line in three-dimensional space, the better the accuracy is to be achieved. If the tracking apparatus TA does not comprise any sensors STA for determining an inclination of the tracking apparatus TA, at least three reference points RP that does not lie on one line in three-dimensional space are needed so that the necessary data is available for reaching the level of capable of tracking the machine in the worksite coordinate system. As discussed above, the state could be named as Tracking.

In addition to or alternatively to the acquiring data by tracking at least three reference points RP with respect to the tracking apparatus TA, the tracking state of the tracking apparatus TA reaching the level of tracking accuracy capable of tracking a point and/or spot of any kind in the worksite coordinate system WCS accurately may be determined by acquiring data by tracking two reference points RP with respect to the tracking apparatus TA in addition to acquiring data relating to at least one of: the inclination of the tracking apparatus TA and the direction to North from the tracking apparatus TA. So, in this embodiment, the inclination information of the tracking apparatus TA and/or the direction to North from the tracking apparatus TA is acquired by some means as described for example above, whereby the tracking of only two reference points RP is enough for determining the tracking state of the tracking apparatus TA reaching the level of capable of tracking the machine in the worksite coordinate system WCS.

It should be noted that in cases where inclination of the tracking apparatus TA is used with tracking two reference points RP, the reference points may not reside one above the other, or parallel, with respect to the gravitational field of the earth—if they are, direction to North remains unsolved. Thus, in this case, the farther (measured in angle) the reference points are from being one above the other, or the more perpendicular, the better the accuracy achieved.

Further, it should be noted that in cases where direction to North from the tracking apparatus TA is used with tracking two reference points RP, the reference points may not reside at the same height from the earth, meaning at the same level with respect to the gravitational field of the earth—if they are, inclination of the tracking apparatus TA remains unsolved. Thus, in this case, the farther (measured in angle) the reference points RP are from being at the same height from the earth, meaning at the same level, or the more parallel, with respect to the gravitational field of the earth the better the accuracy achieved.

In addition to or alternatively to the acquiring data by tracking at least three reference points RP with respect to the tracking apparatus TA and/or the acquiring data by tracking two reference points RP with respect to the tracking apparatus TA in addition to acquiring data relating to at least one of: the inclination of the tracking apparatus TA and the direction to North from the tracking apparatus TA, the tracking state of the tracking apparatus TA reaching the level of tracking accuracy capable of tracking a point and/or spot of any kind in the worksite coordinate system WCS accurately may be determined by acquiring data by tracking one reference point RP with respect to the tracking apparatus TA in addition to acquiring data relating to an inclination of the tracking apparatus and acquiring data relating to a direction to North from the tracking apparatus. Thus, in this embodiment, the inclination information of the tracking apparatus TA and the direction to North from the tracking apparatus TA is acquired by some means as described for example above, whereby the tracking of only one reference point RP is enough for determining the tracking state of the tracking apparatus TA reaching the level of capable of tracking the machine in the worksite coordinate system WCS.

In addition to or alternatively to the acquiring data by tracking at least three reference points RP with respect to the tracking apparatus TA and/or the acquiring data by tracking two reference points RP with respect to the tracking apparatus TA in addition to acquiring data relating to at least one of: the inclination of the tracking apparatus TA and the direction to North from the tracking apparatus TA and/or the acquiring data by tracking one reference point RP with respect to the tracking apparatus TA in addition to acquiring data relating to an inclination of the tracking apparatus and acquiring data relating to a direction to North from the tracking apparatus, the tracking state of the tracking apparatus TA reaching the level of tracking accuracy capable of tracking a point and/or spot of any kind in the work site coordinate system WCS accurately may be determined by acquiring data by determining locations of at least four satellites with respect to the tracking apparatus TA. In this embodiment the at least two antennas 12 in the tracking apparatus TA determine the location of the at least four satellites with respect to the tracking apparatus TA. FIG. 7 shows schematically, on the right, a tracking apparatus TA with two antennas 12. With less than four satellites the acquired data does not provide accurate information unless the tracking apparatus TA comprises more than two antennas 12. In this embodiment, instead of equipping all the machines in the worksite with at least two antennas 12 the tracking apparatus TA may be equipped with at least two antennas 12. Further, regarding to this embodiment, according to which the tracking apparatus TA is equipped with at least two antennas 12, at least one of the at least two antennas 12 may reside in the worksite 13. In this embodiment the antenna 12 residing in the worksite 13 needs to be located optically with respect to the tracking apparatus TA by using, for example, at least one of the tracking devices TD of the tracking apparatus TA.

According to the above stated embodiments regarding the tracking apparatus TA to reach the level of capable of tracking the machine in the worksite coordinate system WCS, i.e. the Tracking-state, after the level is reached, the level may remain although the minimum requirements are not fulfilled in every time instant if the tracking apparatus TA is able to determine that it has remained it's stability. Similarly, according to the above stated embodiments it is possible to detect if the tracking state changes or if the tracking state is in the Pending-state or Out-state.

According to an embodiment, acquiring data by tracking locations of the one or more reference points RP with respect to the tracking apparatus TA is accompanied by identifying the initial locations of the one or more reference points RP by semi-automatically and/or automatically.

When the initial locations of the one or more reference points RP are identified semi-automatically, the operator 10 finds the at least one reference point RP at the worksite 13 and guides the tracking apparatus TA to focus to the at least one reference point RP. Alternatively, the operator 10 may direct the tracking apparatus TA towards the area comprising the at least one reference point RP and the tracking apparatus TA itself identifies the at least one reference point RP at the worksite 13 and focuses to the at least one reference point RP. The operator 10 may for example select the at least one reference point RP in a menu or a database of the reference points RP to be the specific at least one identified reference point RP or the positioning system PS itself identifies the at least one reference point RP in the menu or the database of the reference points RP. The menu or the database of the reference points RP may for example be retrieved from a cloud service into the control unit 11 of the excavator 1, whereby they are retrievable from the excavator 1 by the at least one position determination unit PDU.

When the initial locations of the one or more reference points RP are identified automatically, the tracking apparatus TA itself identifies a necessary number of the reference points RP at the worksite 13 and allocates them with the information in a database comprising worksite information.

The identification of the initial locations of the one or more reference points RP by semi-automatically and/or automatically may be controlled by the control unit 11 of the excavator 1 and/or by the tracking apparatus TA and/or by the position determination unit PDU. The identification of the initial locations of the one or more reference points RP is done in order to individualize the reference points RP to the position determination unit PDU and retrieve the location information regarding each identified reference point RP so that the position determination unit PDU can operate correctly. The location information regarding each reference point RP in the worksite 13 may be input using a wireless or wired I/O device and/or may be retrievable from any known location such as worksite computer, cloud service and/or any computer or memory medium reachable by any wired or wireless network.

According to an embodiment, the tracking apparatus TA further determines a location and an orientation of the tracking apparatus TA itself based on the acquired data, and that the acquired data transmitted from the tracking apparatus TA to the at least one position determination unit PDU comprises at least location and orientation data of the tracking apparatus TA, tracking data regarding at least three marker points MP and data wherefrom the tracking state of the tracking apparatus TA may be determined. The tracking apparatus TA may be able to determine the location and orientation thereof for example with the sensors disclosed above. The position determination unit PDU thereafter determines the location and orientation of the machine based on the acquired data transmitted to the position determination unit PDU from the tracking apparatus. This embodiment is suitable to be used with machines that do not comprise any sensors or comprises only a few sensors regarding determining position and orientation of the machine therein but, however, comprises the position determination unit PDU. Based on the features disclosed herein the machine and especially the position determination unit PDU therein receives sufficiently data to be able to determine the location and orientation of the machine and the accuracy of the determined location and orientation. According to this embodiment the tracking apparatus TA determines beforehand its own position so that it does not need to be momentarily aware about the data based on which the location and orientation thereof is determined. Further, according to this embodiment the tracking apparatus TA may be used as a temporary reference point to other tracking apparatuses TA. In this case, the temporary reference point should by some generally known means indicate when it may be used as a temporary reference point. Accordingly, tracking apparatus may comprise respective temporary reference marker comprising at least one temporary reference point and the location information should thus be available likewise is available the location information regarding each reference point RP disclosed above.

According to an embodiment the position determination unit PDU further determines a level of accuracy of the determined location and orientation of the machine, and based on the determined level of accuracy, the machine provides at least one of the following options: a) enables the operation modes that may be selected at the current level of accuracy, b) indicates an operator if the current level of accuracy is below and/or falling below threshold level regarding the operation mode of the machine selected; and c) disables operation modes that need more accurate location and orientation of the machine. According to this embodiment the operation modes of the machine, i.e. the work tasks of the machine, may be classified based on the accuracy of the location and orientation of the machine needed to carry out the specific work task with the machine. If the present location or orientation accuracy of the machine is not high enough for carrying out a specific work task, the machine is prevented to carry out that specific work task until the location and orientation accuracy is high enough or at least the operator may be informed that the specific work task may not be recorded and/or considered as done since the location and orientation accuracy is not above threshold level required in this work task. The location accuracy is considered to be the higher the more there are acquired reference point RP and marker point MP data, the newer the data are and the more versatile the acquired data are. The location accuracy depends, as well, on how near from each other the reference points RP and the marker points MP whose data is acquired are from each other and which are the location of these reference points RP and marker points MP with respect to each other and what sensor information is additionally available, such as inclination and/or direction to North as disclosed above.

The acquired reference point RP and marker point MP data are versatile if there are location and orientation data about reference points RP and marker points MP being both substantially close to the tracking apparatus TA and substantially far away from the tracking apparatus TA. In addition to the information containing the reference point RP and marker point MP data, the positioning accuracy may depend on possible information regarding to stability and inclination of the machine as received from machine and the sensors therein.

According to an embodiment of the positioning system PS, at least one tracking apparatus TA comprises at least one tachymeter, and at least one marker point MP is a prism or a tag that can be detected by the tachymeter. Furthermore, according to this embodiment the machine comprises at least one gyroscope and/or at least one acceleration sensor in known position with respect to the at least one marker point MP, and the at least one position determination unit PDU further comprises receiving means for receiving data relating to the position of the at least one gyroscope and/or the at least one acceleration sensor with respect to the at least one marker point MP and for receiving data from the at least one gyroscope and/or the at least one acceleration sensor. The gyroscope in the machine provides information about the orientation changes of the machine and in some circumstances a direction to North, the gyroscope being able to learn for example the orientation of the upper carriage 2b of the excavator 1 by a few revolutions of the upper carriage 2b relative to the under carriage 2a. The acceleration sensor in the machine provides information about the direction of gravitational field of the earth, thus, information regarding the inclination of the machine. In this embodiment there are thus available also data from the gyroscope and/or the acceleration sensor, which data may be utilized to define changes in location and orientation of the machine between operation cycles of the tachymeter.

Figure 10:
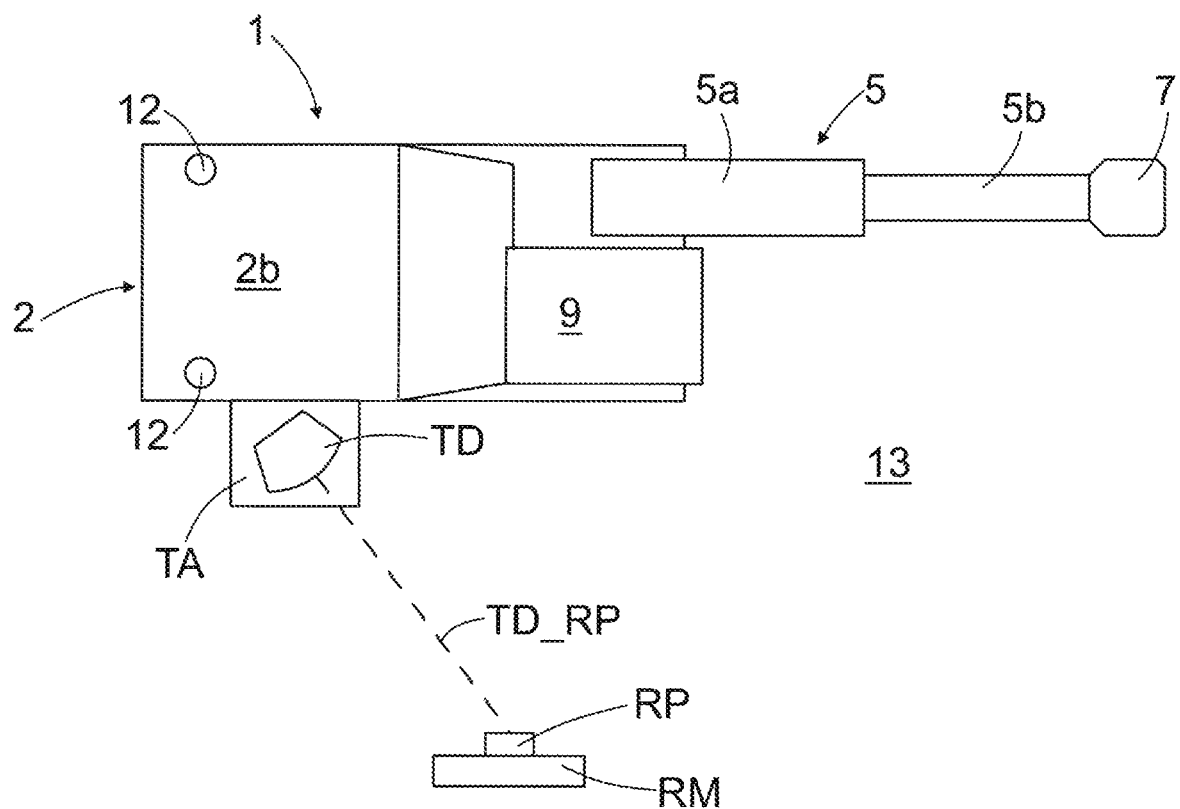
FIG. 10 shows schematically an upper view of a second worksite.
Figure 11:
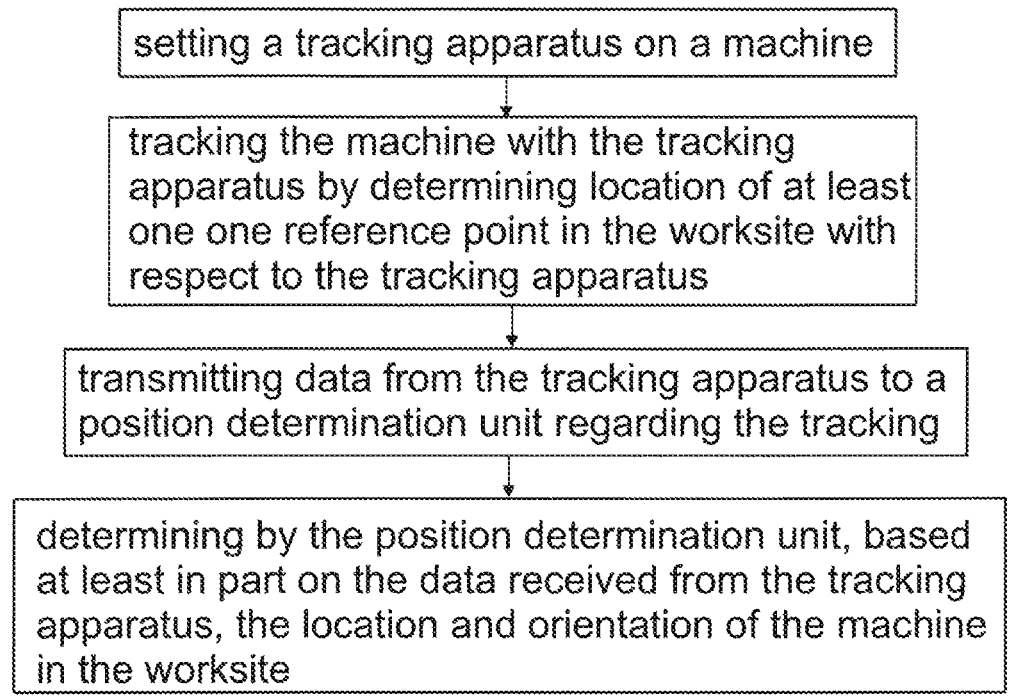
FIG. 11 shows schematically an embodiment of another method for determining location and orientation of a machine in a worksite.

According an embodiment of a method for determining location and orientation of a machine in a worksite 13, the worksite 13 is equipped with at least one reference point RP, and the method comprises setting a tracking apparatus TA on the machine, tracking the machine with the tracking apparatus TA by determining location of at least one reference point RP in the worksite 13 with respect to the tracking apparatus TA, transmitting data from the tracking apparatus TA to a position determination unit PDU regarding the tracking, and determining by the position determination unit PDU based at least in part on the data received from the tracking apparatus TA the location and orientation of the machine in the worksite 13. According to this embodiment the machine itself, such as the excavator 1, is provided with the tracking apparatus TA that is arranged to track the machine by determining location of at least one reference point RP in the worksite 13 with respect to the tracking apparatus TA. FIG. 10 shows schematically an upper view of a worksite 13 with a machine provided with the tracking apparatus TA, whereby there is a visual connection TD_RP between a tracking device TD of the tracking apparatus TA and the reference point RP at a reference marker RM. FIG. 11 shows schematically the method according to this embodiment for determining location and orientation of the machine in the worksite 13. In this embodiment marker points MP intended to be set to the machine may be omitted or one or more marker points MP known in the machine coordinate system MCS may be used in verifying that the tracking apparatus TA re-attached to the machine resides at the same position and orientation as when previously attached, thus, making it possible to detach the tracking apparatus TA after day's work.

According to an embodiment the tracking device TD may be a lidar, which may be a mechanical lidar or a solid state lidar. Because of narrower field of vision of the solid state lidar when compared to the mechanical lidar the number of the solid state lidars required for a specific application may be higher than that of the mechanical lidars. However, the possible higher number of the solid state lidars required is to be compensated by a remarkable smaller price thereof when compared to prices of mechanical lidars.

If the tracking device TD is a lidar, the respective reference point RP is selected such that the lidar is able to detect the reference point RP. The reference point RP may for example comprise a number of balls, i.e. one or more balls. If a single reference marker RM comprises a single ball as a reference point RP, different reference markers RM at the worksite 13 may comprise a ball of different size in respect of the other reference markers RM, each reference marker RM and the corresponding reference point RP being thereby unique in respect of the other reference markers RM and the respective reference points RP therein. The diameters of the balls forming the respective reference points RP may for example be selected to be 5 cm, 10 cm, 15 cm, . . . , or 2 cm, 4 cm, 6 cm, 8 cm, . . . or 3 cm, 6 cm, 9 cm, 12 cm . . . etc. The sizes of the balls and their mutual diameter difference may be selected on the basis of actual distances between the tracking device(s) TD and the reference point(s) RP at the worksite 13.

According to an embodiment, if there are several reference markers and respective reference points RP at the worksite 13, each reference point RP may comprise a number of balls of same size but in different arrangements, or a number of balls of different size in same or different arrangements to make each reference point RP unique so that the reference points RP can be differentiated from the other reference points RP.

According to an embodiment, if there are several reference markers RM and respective reference points RP at the worksite 13, each reference point RP may comprise a number of balls of same size and, in addition to that, a number of balls, i.e. one or more, of different size to differentiate each reference point RP from the other reference points RP. Instead of one or more balls of different size, the reference points RP may be differentiated from each other by a code applied in the reference point. The code may for example be machine-readable by an appropriate sensor, or the code may be stored manually in an appropriate menu or database, whereby the location of the specific reference point RP at the worksite 13 may be determined based on the code. The codes of the reference points RP and the locations of the respective reference points RP may be instructed to the positioning system PS such that the positioning system PS is able to differentiate the reference points RP from each other with a substantially moderate level of accuracy even after the first successful positioning thereof, preventing a need for repositioning them after each change in the alignment thereof.

According to an embodiment of the method, wherein the machine is provided with the tracking apparatus TA, the method further comprises initializing a tracking state for the tracking apparatus TA by determining location and orientation of the tracking apparatus TA in a machine coordinate system MCS. According to this embodiment the tracking apparatus TA may be introduced by setting the tracking apparatus TA on the machine and allowing the tracking apparatus TA to check or verify its position relative to the machine.

According to an embodiment of the method, wherein the machine is provided with the tracking apparatus TA, the method further comprises indicating by the position determination unit PDU the current level of accuracy regarding the location and orientation of the machine achieved by the data received from the tracking apparatus TA. The level of accuracy regarding the location and orientation of the machine achieved by the data received from the tracking apparatus TA may cause, if the level of the accuracy is low, that work tasks requiring high level of accuracy is prevented to be carried out or carrying out is finished, as long as the level of accuracy is not high enough.

According to an embodiment of the method, wherein the machine is provided with the tracking apparatus TA, the method further comprises determining a level of accuracy regarding the location and orientation of the machine to be achieved, meaning above the minimum threshold level pre-determined, detecting by the position determination unit a need for higher level of accuracy regarding the location and orientation of the machine, and acquiring by the position determination unit an additional tracking data from the tracking apparatus. According to this embodiment the level of accuracy regarding the location and orientation of the machine to be achieved may be determined, for example, as a minimum threshold level, for example by a control unit of the machine, the position determination unit PDU or the building information modeling (BIM)-model residing, for example in cloud service or the worksite computer, on the basis of the specific work task to be carried out by the machine, or on the basis of the information provided by the operator. Thereafter the position determination unit PDU may detect the need for the higher level of accuracy regarding the location and orientation of the machine and acquire additional tracking data from the tracking apparatus TA. The additional tracking data may be acquired from the tracking apparatus TA semi-automatically and/or automatically.

The acquiring of the additional tracking data from the tracking apparatus TA semi-automatically comprises arranging the position determination unit PDU to provide at least one of: indicating the operator 10 the need for the tracking apparatus TA to detect at least one reference point RP, indicating the operator the need for the tracking apparatus TA to detect another reference point RP, and indicating the operator the need for the tracking apparatus TA to detect at least one further reference point RP, whereby the operator may operate the machine according to the indication. The acquiring of the additional tracking data from the tracking apparatus TA thus comprises retrieving information from the location and orientation of at least one reference point RP in a case where the tracking apparatus TA is not able to detect any reference point RP, or from the location and orientation of at least one additional reference point RP in a case where the reference points RP already tracked by the tracking apparatus TA are not able to provide sufficiently information to determine the location and orientation of the machine in the worksite 13 accurately enough.

According to an embodiment of the method for acquiring the additional tracking data from the tracking apparatus TA semi-automatically, the setting of the tracking apparatus TA on the machine comprises setting the tracking apparatus TA on the machine on an adjustable base B, whereby the operator 10 may operate the adjustable base B according to the indication received from the position determination unit PDU, and after each operating of the adjustable base B initializing of the tracking state for the tracking apparatus TA by determining location and orientation of the tracking apparatus TA in the machine coordinate system MCS occurs. According to this embodiment the operator 10 may adjust, by operating the adjustable base B, the tracking apparatus TA to find or localize the at least one reference point RP intended to be tracked by the tracking apparatus TA.

According to an embodiment of the method for acquiring the additional tracking data from the tracking apparatus TA automatically, the setting of the tracking apparatus TA on the machine comprises setting the tracking apparatus TA on the machine on an adjustable base B, and the additional tracking data from the tracking apparatus TA is acquired automatically by controlling the adjustable base B by at least one of the tracking apparatus TA and the position determination unit PDU. According to this embodiment, the at least one of the tracking apparatus TA and the position determination unit PDU is configured to adjust the adjustable base B such that the tracking apparatus TA finds or localizes the at least one reference point RP intended to be tracked by the tracking apparatus TA.

Figure 12:
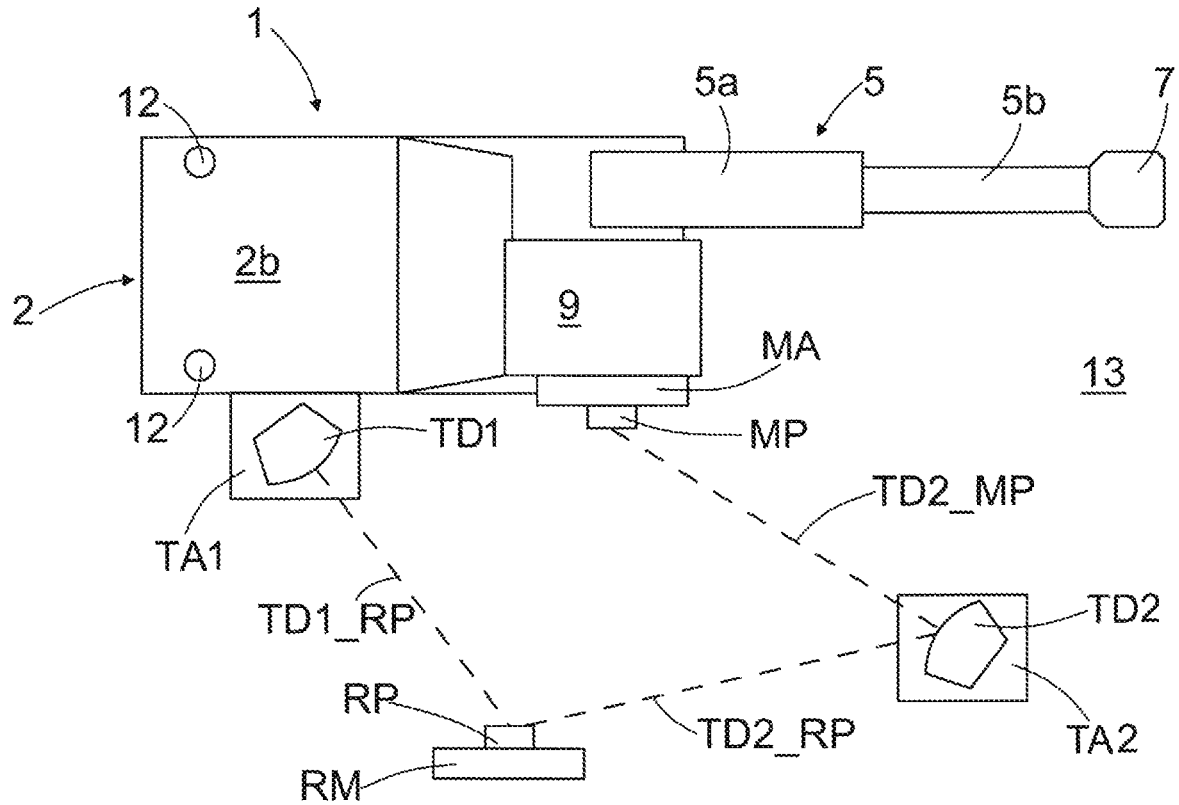
FIG. 12 shows schematically an upper view of a third worksite.

According to an embodiment of the method, wherein the machine is provided with the tracking apparatus TA, the method further comprises setting one or more additional tracking apparatuses TA to the worksite 13 and equipping the machine with at least one marker point MP known in the machine coordinate system MCS, acquiring data by the one or more additional tracking apparatuses TA by tracking reference point RP and marker point MP locations with respect to the respective one or more additional tracking apparatuses TA, transmitting the acquired data from the one or more additional tracking apparatuses TA to the at least one position determination unit PDU, and determining by the at least one position determination unit PDU based at least in part on the data received from at least one of: the tracking apparatus and the one or more additional tracking apparatuses, the location and orientation of the machine in the worksite coordinate system WCS. In other words, in this embodiment one or more additional tracking apparatuses TA are set at the worksite 13 and at least one marker point MP is set at the machine, the marker point MP intended to be tracked by the at least one additional tracking apparatus TA. FIG. 12 shows schematically an upper view of a worksite 13 with the machine provided with a first tracking apparatus TA1 and the worksite 13 provided with a second tracking apparatus TA2, whereby there is a visual connection TD1_RP between a first tracking device TD1 in the first tracking apparatus TA1 set on the machine and the reference point RP at a reference marker RM in the worksite 13 and visual connections TD2_MP between the second tracking device TD2 in the second tracking apparatus TA2 set in the worksite 13 and the marker MP at a marker MA set in the machine and TD2_RP between the second tracking device TD2 in the second tracking apparatus TA2 set in the worksite 13 and the reference point RP at the reference marker RM in the worksite 13.

According to an embodiment of the method comprising one or more additional tracking apparatuses TA, determining of the location and orientation of the tracking apparatus TA in the machine coordinate system MCS may be determined using one of the additional tracking apparatuses TA. According to this embodiment determining of the location and orientation of the tracking apparatus TA, that is set in the machine, may be determined in the machine coordinate system MCS using one of the additional tracking apparatuses TA.

The excavator 1 is an example of a mobile earthworks machine in connection with which the solution for determining location and orientation of the machine in a worksite may be utilized. In addition to the excavators like that the measuring arrangement disclosed herein could also be utilized for example in mobile cranes comprising a carriage part arranged to rotate relative to the rest of the mobile crane, and wherein the rotatable carriage part comprises a lifting boom, and a hook at the distal end of the boom providing a working tool of the crane. The solution for determining location and orientation of the machine in the worksite is substantially similar in the mobile cranes. Other machines, in addition to the excavators and mobile cranes, wherein the disclosed solution could also be utilized, are for example dozers, wheel loader, rollers, backhoes, dump trucks, forwarders, harvesters and the like.

It will be obvious to a person skilled in the art that, as the technology advances, the inventive concept can be implemented in various ways. The invention and its embodiments are not limited to the examples described above but may vary within the scope of the claims.

The invention claimed is:

1. A method for determining location and orientation of a machine in a worksite, the worksite being equipped with at least one reference point, wherein the at least one reference point is in the worksite and has a location determined in a worksite coordinate system, the method comprising:
   setting a tracking apparatus on the machine;
   initializing a tracking state for the tracking apparatus by determining location and orientation of the tracking apparatus in a machine coordinate system;
   acquiring data by the tracking apparatus by tracking location of a reference point in the worksite with respect to the tracking apparatus;
   transmitting data from the tracking apparatus to a position determination unit regarding the tracking, wherein the data regarding the tracking comprises at least the tracked location of the reference point relative to the tracking apparatus;
   acquiring data by at least one sensor, wherein the data comprises inclination of the tracking apparatus and heading of the tracking apparatus;
   transmitting the data from the at least one sensor to the position determination unit; and
   determining by the position determination unit, based at least in part on the data regarding the tracking and the data from the at least one sensor, the location and orientation of the machine in the worksite.

2. The method according to claim 1, wherein the method further comprises indicating by the position determination unit a current level of accuracy regarding the location and orientation of the machine achieved by the data received from the tracking apparatus.

3. The method according to claim 1, wherein the method further comprises:
   determining a level of accuracy regarding the location and orientation of the machine to be achieved as a minimum threshold level,
   detecting by the position determination unit the level of accuracy regarding the location and orientation of the machine being one of the following: below or falling below the minimum threshold level, and
   acquiring by the position determination unit an additional tracking data from the tracking apparatus.

4. The method according to claim 3, wherein an additional tracking data from the tracking apparatus is acquired by at least one of: semi-automatically or automatically.

5. The method according to claim 4, wherein the additional tracking data from the tracking apparatus acquired semi-automatically comprises:
   arranging the position determination unit to provide at least one of:
   indicating an operator the need for the tracking apparatus to detect a reference point, or
   indicating the operator the need for the tracking apparatus to detect another reference point; and
   the operator operating the machine according to the indication.

6. The method according to claim 5, wherein
   the setting of the tracking apparatus on the machine comprises setting the tracking apparatus on the machine on an adjustable base, the operator operating the adjustable base according to the indication, and after each operating of the adjustable base, initializing of the tracking state for the tracking apparatus by determining location and orientation of the tracking apparatus in the machine coordinate system occurs.

7. The method according to claim 4, wherein the setting of the tracking apparatus on the machine comprises setting the tracking apparatus on the machine on an adjustable base, and the additional tracking data from the tracking apparatus is acquired automatically by controlling the adjustable base by at least one of:

the tracking apparatus or the position determination unit.

8. The method according to claim 7, wherein after the controlling of the adjustable base by at least one of: the tracking apparatus or the position determination unit, initializing of the tracking state for the tracking apparatus by determining location and orientation of the tracking apparatus in the machine coordinate system occurs.

9. The method according to claim 1, wherein the method further comprises:

setting one or more additional tracking apparatuses to the worksite and equipping the machine with at least one marker point known in the machine coordinate system;

acquiring data by the one or more additional tracking apparatuses by tracking reference point and marker point locations with respect to the respective one or more additional tracking apparatuses;

transmitting the acquired data from the one or more additional tracking apparatuses to the at least one position determination unit; and determining by the at least one position determination unit based at least in part on the data received from at least one of: the tracking apparatus or the one or more additional tracking apparatuses, the location and orientation of the machine in the worksite coordinate system.

10. The method according to claim 9, wherein the location and orientation of the tracking apparatus set in the machine is defined in the machine coordinate system using one of the additional tracking apparatuses.

* * * * *